United States Patent [19]

Gajewski et al.

[11] Patent Number: 5,111,329
[45] Date of Patent: May 5, 1992

[54] SOLAR LOAD REDUCTION PANEL WITH CONTROLLABLE LIGHT TRANSPARENCY

[75] Inventors: Kenneth J. Gajewski, Woodhaven, Mich.; Ronald R. Hymore, Oregon, Ohio; Kenneth E. Nietering, Dearborn, Mich.

[73] Assignee: Ford Motor Company, Dearborn, Mich.

[21] Appl. No.: 618,868

[22] Filed: Nov. 28, 1990

[51] Int. Cl.$^5$ .............................. G02F 1/01; G02B 5/23
[52] U.S. Cl. ..................................... 359/275; 359/270; 359/273; 359/260; 359/297
[58] Field of Search .............. 350/353, 355, 357, 164, 350/316; 296/84.1; 52/785, 788; 359/260, 275, 297

[56] References Cited

U.S. PATENT DOCUMENTS

| | | | |
|---|---|---|---|
| 2,507,036 | 5/1950 | McCrumm | 219/19 |
| 3,282,157 | 11/1966 | Jones | 88/107 |
| 3,317,266 | 5/1967 | Heller | 350/160 |
| 3,410,626 | 11/1968 | Magrath | 350/316 |
| 3,443,855 | 5/1969 | Land | 350/250 |
| 3,499,697 | 3/1970 | Edwards | 350/316 |
| 3,560,078 | 2/1971 | McIntyre | 350/160 |
| 3,995,940 | 12/1976 | Guyon et al. | 359/297 |
| 4,226,910 | 10/1980 | Dahlen et al. | 350/316 |
| 4,338,000 | 7/1982 | Kamimori | 350/357 |
| 4,659,178 | 4/1987 | Kyogoku | 350/316 |
| 4,749,261 | 6/1988 | McLaughlin | 350/339 R |
| 4,768,865 | 9/1988 | Greenberg | 350/357 |
| 4,810,067 | 3/1989 | Demiryont | 350/357 |
| 4,830,471 | 5/1989 | Demiryont | 350/357 |
| 4,832,468 | 5/1989 | Ito et al. | 350/357 |
| 4,837,592 | 6/1989 | Demiryont | 350/357 |
| 4,842,382 | 6/1989 | Demiryont | 350/357 |
| 4,844,592 | 7/1989 | Demiryont | 350/357 |
| 4,844,985 | 7/1989 | Pharms et al. | 428/432 |
| 4,927,239 | 5/1990 | Melzig et al. | 350/164 |
| 4,929,063 | 5/1990 | Ourand et al. | 350/353 |

FOREIGN PATENT DOCUMENTS 63-153503 6/1988 Japan .................................. 350/316

OTHER PUBLICATIONS

*Machine Design*, "Encapsulated Crystals Control Viewing Pattern".
SAE Spring of 1989, "Electrically Controlled Light Transmission Glazing For Automotive Applications Based on NCAP Technology".

*Primary Examiner*—Rolf Hille
*Assistant Examiner*—Mahshid Saadat
*Attorney, Agent, or Firm*—Charles H. Ellerborck; Roger L. May

[57] ABSTRACT

A laminated glazing unit is disclosed having controllable transparency to visible light and a solar load reduction element which preferentially excludes infrared radiation while being substantially transparent to visible light. The solar load reduction element comprises a Fabry-Perot interference filter which includes a film stack deposited on the laminated surface of the outer ply of the glazing unit. The film stack includes at least a zinc oxide film followed by a silver metal film followed by a second zinc oxide film followed by a second silver metal film followed by a dielectric film which provides good long term adhesion durability to an adjacent laminating layer of PVB or like material. The dielectric film preferably is zinc oxide with a thin overcoat of chromium oxide, $SiO_2$ or, alternatively, is tantalum pentoxide. The electro-active means for controlling the transmission of visible light through the glazing unit comprises electrodes, separate from the SLR element, which are deposited on facing surfaces of inextensible polymeric material such as polyethylene terephthalate.

24 Claims, 4 Drawing Sheets

SOLAR LOAD REDUCTION PANEL WITH CONTROLLABLE LIGHT TRANSPARENCY

FIELD OF THE INVENTION

This invention relates generally to multi-element, laminated vision panels and, more particularly, to vision panels which provide solar load reduction together with selectively controllable transparency to visible light. Vision panels of the invention are suitable for use, for example, as glazing units for architectural or automotive uses, etc., as lenses and for other applications.

BACKGROUND

Glazing units, such as automotive and architectural glazing units and the like, are known which provide selectively variable transparency to visible light. Glazing units comprising electro-active elements, such as a layer of electrochromic material or liquid crystal, have been suggested for this purpose. Variable transparency elements can be used, in the non-transparent mode, to provide privacy or to reduce glare and/or heating due to sunlight or other light source, particularly light in the infrared range of the spectrum. The substantially transparent condition or mode may be selected for vision through the glazing unit and to allow thermal energy to pass through to heat a space enclosed or partially enclosed by the glazing unit Means for preferentially reflecting infrared energy (preferentially, that is, relative to light in the visible wavelength range) may be incorporated into a vision unit. This is particularly advantageous if the structure is utilized as a motor vehicle sunroof or as an architectural window. Reducing the solar energy passing through a vision unit is becoming increasingly important in architectural and automotive glazing units for reasons including improved environmental control and energy conservation. Particularly in the case of automotive applications, increased glazed surface area in the upper part of the vehicle body, that is, in the window and roof area, has resulted in greatly increased solar heating of the passenger compartment of the vehicle. Such heating by solar energy generally is referred to as solar load and there is a growing demand for vision panels which significantly reduce solar load Such solar load reduction ("SLR") feature, however, cannot be permitted to unduly diminish the transparency of the vision panel to light in the visible wavelength range. This is particularly significant in the case of motor vehicle windows, especially windshields, which may be required by various government regulations to have at least certain minimum transmission of visible light. It is undesirable to handle increased solar load by increasing the size of the motor vehicle air conditioning unit, in view of the overriding need to reduce the size, weight and power consumption of motor vehicle components for increased fuel efficiency. Accordingly, the need to reduce the solar energy load passing through vehicle glazing has become especially critical.

Architectural and automotive glazing applications are now calling for glazing units having selectively variable transparency to visible light together with SLR functionality. Various teachings are known to those skilled in the art regarding glazing units providing variable transparency, solar load reduction or, at some level of efficacy, both these features. Prior to the present invention, however, known glazing units having acceptable manufacturing feasibility and costs have not provided adequate SLR functionality together with effective visible light transparency control. In U.S. Pat. No. 4,338,000 issued on July 6, 1982 to Kamimori et al, a panel is described which is said to be both infrared reflecting and variably transparent. The Kamimori et al device includes a glass or plastic substrate carrying on its surface a tungsten oxide film covered by a metal film which is covered, in turn, by a second tungsten oxide film. A laminating layer of polyvinylbutyral ("PVB") laminates the film covered surface of the substrate to a second substrate which has an indium-tin oxide ("ITO") film on its laminated surface. The ITO film and the metal film are connected to an electrical power source to act as electrodes for the second tungsten oxide film, which is said to provide an electrochromic effect when an electrical potential is applied across the two electrodes. The metal film electrode is said also to reflect infrared radiation. It has been found, however, that this arrangement of a single metal film sandwiched between films of tungsten oxide provides inadequate solar load reduction to meet the stringent requirements of certain automotive and architectural glazing applications. In addition, the durability of the adhesion between the PVB laminating layer and an indium tin oxide film cannot be relied upon to adequately withstand prolonged exposure to sunlight, particularly the ultra-violet component thereof.

Various glazing units are shown in U.S. Pat. No. 4,749,261 issued on June 7, 1988 to McLaughlin et al. The device of McLaughlin et al employs a liquid crystal sandwiched between electrodes and further comprises outer glass plys. The disclosure of the McLaughlin et al patent is incorporated herein by reference for its teachings regarding various elements suitable for use in the laminated vision panel of the present invention. A motor vehicle sunroof is shown to have an outermost glass ply laminated to a layer of PVB to act as a UV absorber, followed by an infrared reflector, followed by a first electrode, a liquid crystal and a second electrode, followed in turn by one or more layers of polyethylene terephthalate or glass. Optionally, the sunroof also comprises a de-polarizer layer and a polarizer layer. The efficacy of the infrared reflector layer in the McLaughlin et al device cannot be determined, since no particular materials for that layer are disclosed. In fact, the McLaughlin et al patent suggests that it may be desirable that the infrared reflective material also uniformly reduce the transmission of visible light. It is suggested that, optionally, the infrared reflector layer may be the first electrode for the liquid crystal. Suitable materials for that element are said to include a stainless steel coating or a tin oxide coating on the liquid crystal material. A layer of tin oxide, however, cannot be made thick enough to provide adequate SLR functionality. Even 50,000 Angstroms on clear glass would provide only film of stainless steel, on the other hand, if it were of adequate thickness to provide substantial and adequate SLR functionality, would exclude far too much visible light for certain automotive and architectural applications. Also, manufacturing feasibility problems would be presented in providing a stainless steel or tin oxide coating directly onto a liquid crystal material in the McLaughlin et al device. In addition, the long term durability of the adhesion of the polyvinylbutyral to such electrode material is problematical. An alternative suggested in McLaughlin et al is to use a so-called low-E coating on the outer surface of the glass ply to reflect infrared energy. Known low-E coatings, however, would present durability issues if used on automotive glazing units in view of the abrasion and other difficult aspects of the use environment experienced by automotive glazing. In another embodiment said to be suitable for architectural purposes, an infrared reflective layer is shown on an outside surface of a layer of glass. The materials suggested for such layer, however, including ITO and tin oxide, do not provide sufficient preferential exclusion of infrared radiation verses visible light to meet the needs of various automotive and architectural applications. In addition, while McLaughlin et al suggest that the electrode for the liquid crystal material may serve also as the IR reflective material, the materials suggested for such combined part are, as discussed above, unable to meet the needs of various automotive and architectural applications.

It is an object of the present invention to provide a glazing unit having both means for selectively controlling transparency and, in addition, means for solar load reduction even when the vision panel is in a transparent mode. It is an object of certain preferred embodiments of the invention to provide a glazing unit which can be manufactured in accordance with commercially practical methods and technologies and which provides effective, full-time solar load reduction together with electro-active means for selectively controlling the transparency to visible light. It is a particular object of certain most preferred embodiments of the invention to provide such a glazing unit which is suitable for use as a window in a motor vehicle.

SUMMARY OF THE INVENTION

According to the present invention, a laminated glazing unit is provided which is substantially transparent to visible light in at least one selectable condition. The glazing unit of the invention comprises a ply which is substantially transparent, substantially inextensible and substantially self-supporting, generally forming an exterior ply of the glazing unit and being referred to as such herein. It may have one or more coatings, films or the like on its exterior surface. The interior surface of the exterior ply ("interior" in this usage meaning its laminated surface, that is, the surface which is laminated to, and forms an interface with, another ply or element of the glazing unit) is laminated to an electro-active means for controlling transparency to visible light. The electro-active means comprises first and second flexible, substantially inextensible polymer layers, each having an inward surface facing the other. First and second electrodes are provided on the inward surface of the first and second polymer layers, respectively, and a layer of electro-active material is sandwiched between the electrodes. The electro-active material is controllably switchable from a first condition in which it is substantially transparent to visible light to a second, less transparent condition by selected application of electrical potential across the electrodes. Thus, in use, the electrodes of the glazing unit will be operatively connected to a source of electrical energy, such as the battery or, preferably, the generator or alternator system of a motor vehicle. The electro-active means is laminated to the self-supporting exterior ply by means of a layer of flexible polymeric material, for example polyvinylbutyral.

To meet the growing need for glazing units having highly efficient solar load reduction capability, particularly for architectural and automotive glazing applications, the glazing unit of the present invention further includes an SLR element. Specifically, the present invention provides a highly effective SLR element between the exterior ply and the electro-active means. Such SLR element reduces solar energy passed through the glazing unit even when the electro-active means is in its transparent condition. The SLR element preferentially excludes non-visible wavelengths (most notably infrared wavelength) radiation while permitting a greater percentage of visible wavelength light to pass through the glazing unit. To meet not only the high SLR functionality requirements of certain architectural and automotive applications, but also applicable manufacturing cost and feasibility requirements, the SLR element of the present invention is a sputter coated Fabry-Perot interference filter for reducing total energy transmission through the glazing unit, preferentially reducing infrared wavelength energy. Specifically, the Fabry-Perot interference filter employed by the present invention is a film stack coated onto the surface of the exterior ply, between the exterior ply and the laminating layer. More specifically, the film stack comprises, in order, a first continuous zinc oxide film directly on the interior surface of the exterior ply, then a first continuous silver metal film directly over the first zinc oxide film, then a second continuous zinc oxide film, then a second continuous silver metal film and a third continuous dielectric film The third dielectric film is in interfacial contact with the laminating layer. As discussed further below, the third dielectric film can be a third zinc oxide film, preferably with a chromium oxide or $SiO_2$ film between the zinc oxide and the laminating layer to promote more durable adhesion of the film stack to the laminating layer. Alternatively, the third dielectric film can be tantalum pentoxide or other suitable metal oxide or the like.

The features and functions of the glazing unit of the invention and its various advantages will be better understood from the following detailed description of various preferred embodiments of the invention. Certain features or elements which can optionally be included in certain preferred embodiments also are disclosed and discussed below.

BRIEF DESCRIPTION OF THE DRAWINGS

It should be understood that features and elements of the embodiments of the invention illustrated in FIGS. 1 through 4 are not necessarily precisely to scale. Thickness of electrodes and sputtered SLR coatings are shown larger than true scale, for example, for better clarity and understanding.

DESCRIPTION OF PREFERRED EMBODIMENTS

Glazing units in accordance with the present invention may be adapted for use as architectural windows, including skylights; motor vehicle windows, including windshields and sunroofs; privacy glass for various applications such as motor vehicle or interior building partition panels; and other applications. In all such applications the features and functions of the invention follow the general principles discussed below. The invention provides particular advantage and is particularly suitable for use in motor vehicle glazing applications in which the rapidly increasing demand for ever greater glazed area (in lieu of metal or other opaque body panel materials) in the window and roof area has created a sharply felt need for glazing panels having significantly improved SLR functionality. At the same time, such increased use of glazing has increased the need for some means of providing privacy, reduced glare or even total sun block for the vehicle occupants in some or all of the glazed area.

Certain preferred embodiments of the invention employ a liquid crystal element as the electro-active means. Other embodiments employ an electrochromic element. In those which employ a liquid crystal element, transparency of the glazing unit to visible light is controlled by selectively switching between transparent and translucent conditions. The translucent condition causes light scattering and generally little light exclusion. Thus, glazing units of the invention employing a liquid crystal element in the electro-active means can provide privacy and reduced glare. In those embodiments which employ an electrochromic element in the electro-active means, transparency of the glazing unit to visible light is controlled by selectively switching between transparent and less transparent, or even opaque, conditions. Thus, glazing units of the invention employing an electrochromic element can provide privacy, reduced glare and, in addition, total or partial blocking for enhanced SLR functionality.

The preferred embodiments of the invention now described, employing a liquid crystal electro-active element, meet the current federal motor vehicle windshield requirement of 70% visible light transmittance. They can satisfy stringent functional requirements, for example, excluding as much as 65% of the total incident solar radiation while transmitting at least 70% of the incident visible light when the electro-active element of the glazing unit is in its transparent condition. In preferred embodiments employing an electrochromic element, the same transmittance can be achieved in the transparent state, while more than 95% of total incident solar radiation is excluded when the electro-active element is in its nontransparent state. Beyond merely providing the aforesaid SLR functionality and controllable transparency features, these glazing units have advantageous weight, bulk and cost characteristics. They are relatively thin in cross section and have relatively good manufacturing feasibility coupled with relatively low manufacturing costs. In addition, they are sufficiently durable to withstand prolonged use in an automotive environment. In particular, they can maintain good interfacial adhesion between laminated layers even after prolonged exposure to sunlight or other source of UV radiation.

Figure 1:
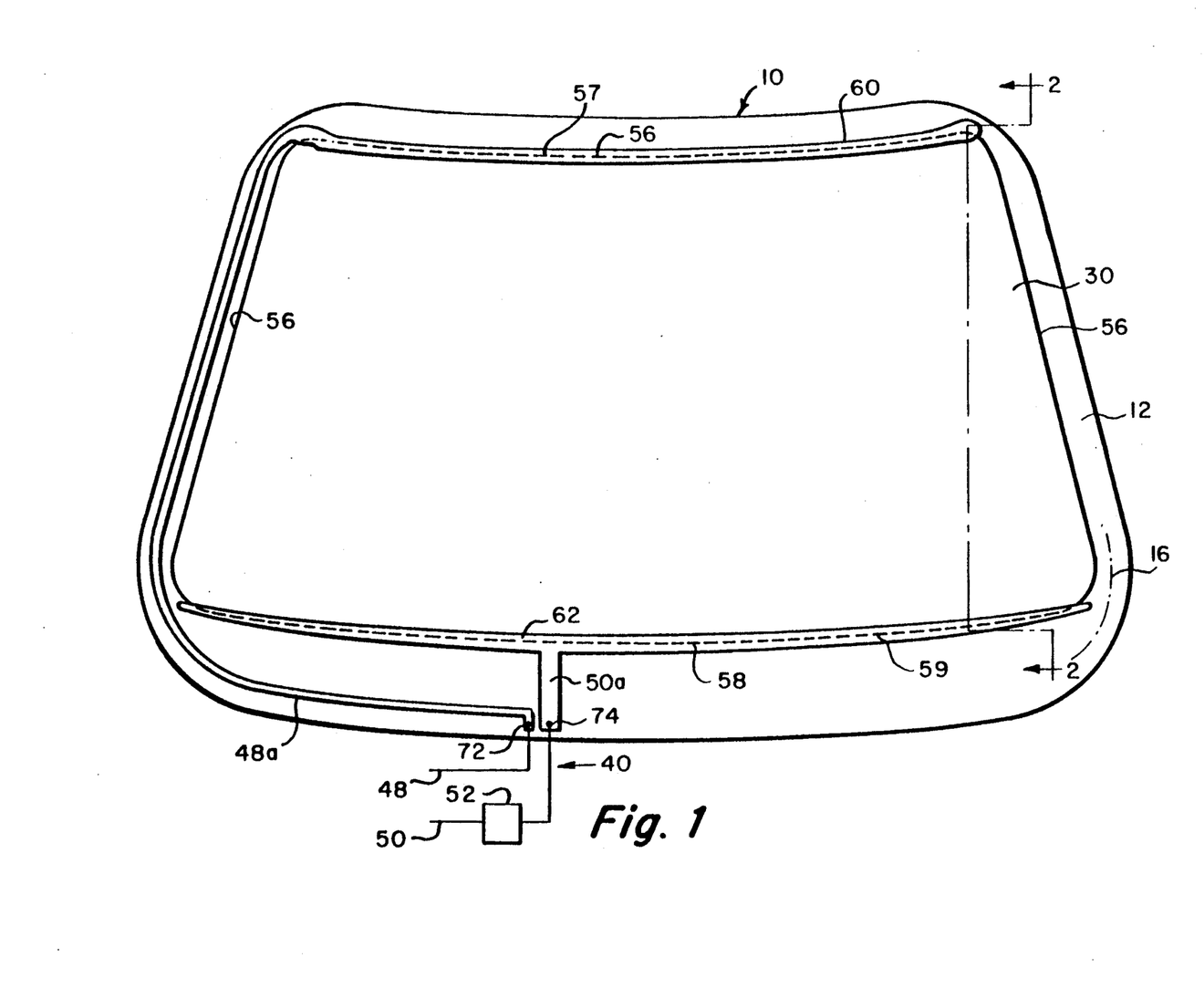
FIG. 1 is a schematic view of a preferred embodiment of the glazing unit of the invention, specifically, a motor vehicle window.
Figure 2:
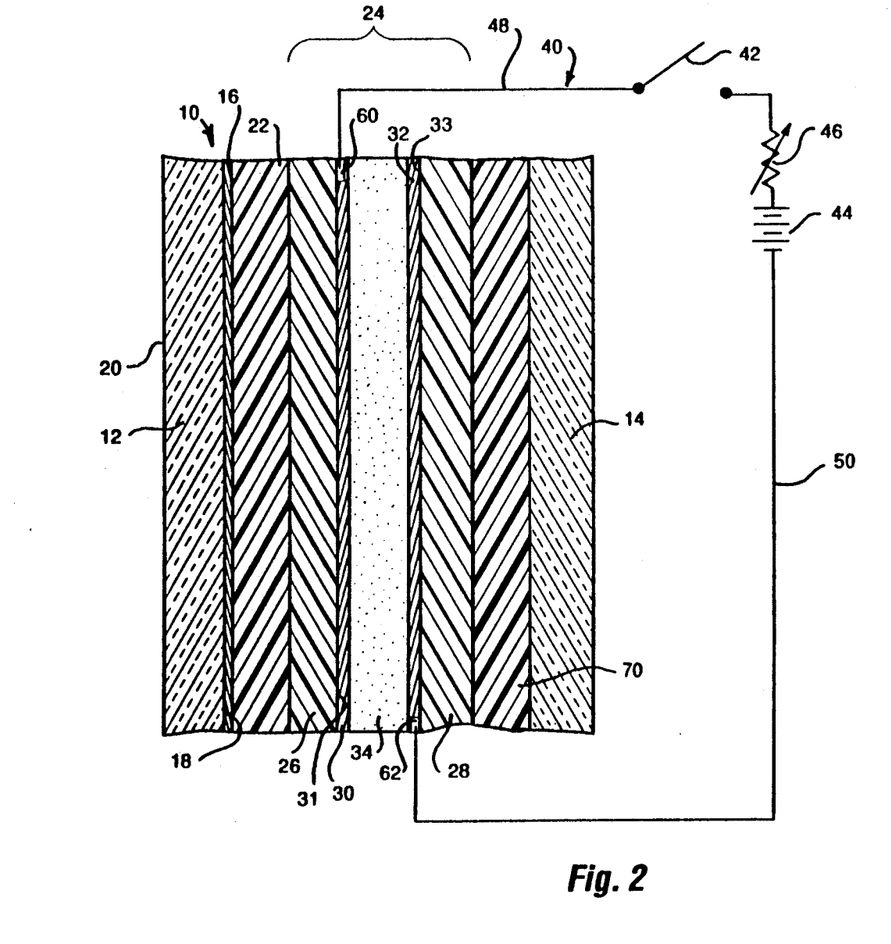
FIG. 2 is a schematic, partial sectional view of the motor vehicle window of FIG. 1 taken through line 2—2, wherein an electrical circuit is illustrated diagrammatically, including connection of the electro-active means of the window to a source of electrical power.

Referring now specifically to FIGS. 1 and 2, a glazing unit 10, in accordance with a preferred embodiment of the invention, is adapted for use as a motor vehicle window, for example a moon roof. Window 10 comprises transparent outer glass ply 12 and inner glass ply 14. As used herein the term "transparent" means substantially transparent at least to visible light, that is, to radiation in the visible wavelength range. Suitable transparent substrate materials and constructions alternative to glass plys will be apparent to the skilled of the art in view of the present disclosure. Selection of a particular outer and inner ply material will depend, in part, on the particular application to be made of the glazing unit. Commercially available materials alternative to glass include, for example, plastics such as polyethylene terephthalate ("PET"), polycarbonate, polymethacrolate and the like. Optionally, additional functional or decorative elements may be added, such as an anti-reflective coating or other coating on any appropriate surface of the outer and inner plys.

Glazing unit 10 is seen to further comprise an SLR element 16 on the laminated surface of glass ply 12. Reference herein to a surface as a "laminated" surface means that it forms a laminated interface with another ply within the laminated structure. Thus, SLR element 16 is carried on laminated surface 18 of outer glass ply 12. As noted above, exterior surface 20 of glass ply 12 also could be partially or entirely covered by a film or other coating.

The SLR element 16 comprises a Fabry-Perot interference filter which preferentially or selectively excludes infrared light. That is, it excludes a substantial portion of the infrared wavelength radiation while transmitting a substantial portion of the visible light. The Fabry-Perot interference filter of the preferred embodiment of FIGS. 1 and 2 comprises a film stack including, in order: a first continuous zinc oxide dielectric film having a thickness of about 300 to 450 Angstroms; a first continuous electrically conductive silver metal film having a thickness of about 70 to 120 Angstroms; a second continuous zinc oxide dielectric film having a thickness of about 650 to 1000 Angstroms; a second continuous silver metal film having a thickness of about 70 to 120 Angstroms; and a third continuous dielectric film. The third dielectric film is at the interface with laminating layer 22. Suitable laminating materials are commercially available and well known to those skilled in the art. Most preferred is polyvinylbutyral (PVB). Obviously, durability of the interfacial adhesion between the SLR element 16 and the PVB or other laminating layer 22 must be excellent to qualify the glazing unit for long term use applications such as automotive and architectural glazing applications. To achieve this end, the present invention preferably employs as the third dielectric film of the SLR element 16 a film of zinc oxide having a thickness of about 300 to 450 Angstroms with an ultra-thin film of chromium oxide complex immediately thereover adjacent to the laminating layer 22 in accordance with the teachings of U.S. Pat. No. 4,844,985 to Pharms et al, commonly assigned herewith, which teachings are incorporated herein by reference. The thin chromium oxide film would have a thickness preferably in the range of about 20 to 80 Angstroms.

According to alternative preferred embodiments, excellent durability of adhesion at the interface between the SLR element 16 and the laminating layer 22 is provided by employing as the third dielectric film of the SLR element 16 a film of zinc oxide or other dielectric material having an index of refraction of 1.5 or greater with an ultra-thin adhesion layer of either silicon dioxide or tantalum pentoxide. That is, $SiO_2$ replaces the aforesaid chromium oxide complex layer. The $SiO_2$ or tantalum pentoxide adhesion film preferably would have a thickness of about 75 to 150 Angstroms. A tantalum pentoxide film of about 250 to 450 Angstroms also can be used as the third dielectric film, replacing both the zinc oxide and the adhesion film. Those skilled in the art will appreciate that thicker films of silver, etc can be used in applications not requiring 70% transmittance of visible light. Likewise, the use of clear glass or tinted glass for one or both of the glass plys will affect the permissible film thickness for a given transmittance requirement.

The Fabry-Perot interference filter employed for the SLR element of the present invention can be deposited onto the laminated surface 18 of outer ply 12 by various means, including sputter coating techniques well known to those skilled in the art. It should be noted that the thin films employed in the Fabry-Perot film stack of element 16 have essentially no structural integrity of their own. Thus, it is an important feature of the present invention that the film stack is deposited onto the surface of a substantially inextensible substrate such as those mentioned above for outer ply 12. Coating such films onto the surface of the PVB laminating layer would be substantially impossible. The PVB would break down in the vacuum atmosphere used for sputtering and could not withstand the temperature of a chemical vapor deposition ("CVD") process. In addition, adhesion between the laminating layer 22 and the outer ply 12 would be adversely effected if the surface of the laminating layer was coated with the Fabry-Perot film stack and then laminated to a glass ply.

While alternative materials are known for both the metal and the dielectric materials of the film stack, the particular materials and thickness specified above are found to provide an important coincidence of advantages, for example, up to 65% exclusion of total incident solar energy with at least 70% transmittance of visible light, commercially available and feasible manufacturing techniques, and excellent long term durability in architectural and automotive use environments.

Glazing unit 10 further comprises electro-active element 24 and a second laminating layer 70 which serves to laminate the electro-active element 24 to second ply 14. The same materials discussed above in connection with first laminating layer 22 are suitable for second laminating layer 70. Electro-active element 24 controls transparency of the glazing unit to visible light by selected application of electrical potential as further described below. Electro-active element 24 comprises first and second flexible, substantially inextensible polymer layers 26 and 28. Suitable materials for inextensible layers 26 and 28 are commercially available and well known to those skilled in the art. Most preferred is polyethylene terephthalate (PET). In a preferred method for producing superior optically clear laminates having a sheet of semi-rigid material, such as PET, encapsulated in a thermoplastic interlayer, such as PVB, between layers of rigid material, such as glass, pre-cooled laminate elements are assembled at reduced temperature, allowing positioning of the sheet of semi-rigid material in the interlayer of the assembly. Particularly for laminates having relatively extreme bends, this method results in minimal wrinkling, air bubbles and entrapment of moisture. Thereafter, the laminate assembly is maintained under vacuum for an extended period of time, substantially eliminating wrinkling, air bubbles and moisture from between the laminate elements as well as pre-forming the semi-rigid sheet. Bonding heat and pressure is then applied, first heating the assembly to "tack" the laminate elements together, and next applying heat and pressure for bonding the laminate elements. This method is the subject of commonly assigned patent application U.S. Ser. No. 604,609, filed Oct. 29, 1990, entitled Lamination of Semi-Rigid Material Between Glass, the disclosure of which is hereby incorporated by reference.

First and second electrodes 30 and 32 are provided on the inward facing surfaces 31 and 33, respectively, of layers 26 and 28. The electrodes must be substantially transparent to visible light. Numerous suitable materials for electrodes 30 and 32 are commercially available and are well known to those skilled in the art. Suitable materials include, for example, a substantially transparent sputter coated film of indium-tin oxide (ITO) which is preferred, chrome, silver, stainless steel, tin oxide or indium oxide. Fabrication techniques for the electrodes also are well known to those skilled in the art including, most preferably, sputter coating techniques discussed above in connection with the fabrication of the SLR element of the invention. Alternative materials and fabrication techniques will be apparent to those skilled in the art in view of the present disclosure.

An electro-active material 34 is disposed between the electrodes 30 and 32. As used herein, an electro-active material is any suitable material whose transparency to visible light is controllably switchable from a first condition substantially transparent to visible light to a second, less transparent condition by selected application of electrical potential across the aforesaid electrodes. Preferably, the transparency of the electro-active material is continuously variable. As noted above, suitable electro-active materials include liquid crystals and electrochromic materials. Numerous materials of both types are commercially available and are well known to those skilled in the art. Suitable liquid crystal materials, for example, are disclosed in U.S. Pat. No. 4,749,261 discussed above, the disclosure of which is incorporated herein by reference. It will be appreciated that the inextensible layers 26 and 28 in addition to providing a suitable substrate surface for the electrodes 30, 32 preferably cooperate with each other to form an enclosure to contain the liquid crystal or other electro-active material. The liquid crystal preferably is a nematic or operationally nematic liquid crystal having positive dielectric anisotropy with suitable index of refraction characteristics. One preferred type of liquid crystal is a nematic droplet/polymer film liquid crystal. Suitable liquid crystal electro-active elements including polymer layers carrying the electrodes and encapsulating the liquid crystal material are commercially available as a pre-manufactured unit from Taliq Corp., Sunnyvale, Calif. It incorporates a nematic liquid crystal, having a curvilinear aligned phase, with ITO electrodes, encapsulated in a PET envelope. For automotive applications, a voltage converter is used to provide 100 volt A.C. to the unit from an automotive 12 volt D.C source. There are also liquid crystal materials operable with a 12 volt D.C. source without voltage conversion.

Suitable electrochromic materials also are commercially available and well known to those skilled in the art. Exemplary materials include tungsten oxide in accordance with the teachings of U.S. Pat. No. 4,768,865 to Greenberg et al, copper oxide in accordance with the teaching of U.S. Pat. No. 4,830,471 to Demiryont, and bismuth oxide in accordance with the teaching of U.S. Pat. No. 4,842,382 to Demiryont, all of these patents being incorporated herein by reference for their teaching of electrochromic materials and the use thereof in glazing units or the like. Alternative materials are commercially available and their use in the present invention will be apparent to those skilled in the art in view of the present disclosure.

In the preferred embodiment illustrated, electrodes 30 and 32 are in electrical connection with a source of electrical power by means of circuit 40 illustrated diagrammatically in FIG. 2. Circuit 40 is seen to comprise on/off switch 42, electrical power source 44, variable resister 46 and electrical leads 48 and 50. Circuit 40 allows an operator to selectively apply an electrical potential to the electro-active material 34 from electric power supply 44. In the case of an automotive application, such power supply typically would be the vehicle battery or, preferably, the vehicle generator or alternator. Referring particularly to FIG. 1, circuit 40 preferably further comprises circuitry means 52 for interrupting power supply to circuit 40 in the event of a discontinuity or other fault in the electro-active element. Electrode 30 is shown to have a visible outer perimeter 56, although in actual application the perimeter may not be noticeable. Electrode 32 is substantially coextensive with electrode 30, both being coextensive with a major portion of the electro-active material. Horizontally extending upper bus bar 60 is seen to be in substantially continuous line contact with upper edge portion 57 of perimeter 56 of electrode 30. Similarly, lower bus bar 62 is in substantially continuous line contact with lower edge portion 59 of the outer perimeter of the second electrode 32. Thus, application of electrical power to circuit 40 applies electrical potential across the electrodes, thereby controlling the transparency of the electro-active material to visible light. Methods of forming bus bars 60 and 62 are well known to those skilled in the art and will be apparent in view of the present invention.

Lead 48 connects to lead 48a at terminus 72. Lead 48a extends within the glazing unit from terminus 72 to upper bus bar 60. Similarly, lead 50 is connected to lead 50a at terminus 74 and lead 50a runs to bus bar 62. In the case of a motor vehicle, 50 and 50a preferably would be connected to the "hot" wire of the vehicle electrical system and leads 48 and 48a would be connected to ground. Termini 72 and 74 typically comprise a solder pad. The use of pre-soldered pads is preferred once they facilitate making the electrical connections, particularly in the context of assembling a motor vehicle, and are found to provide a secure and sturdy electrical connection The switch 42 may be a manually operated switch, although circuit 40 may include components automatically responsive to ambient light conditions. Circuit 40 may further include a variable resistance element, such as a variable resistor or potentiometer, or circuitry for varying the magnitude of electric field applied by electrodes 30, 32 to the electro-active material 34. Such variable element could be manually or automatically adjustable, preferably to render the transparency of the electro-active material continuously variable.

It is a significant advantage of the present invention that sputter coating processes and equipment for forming the SLR element are readily commercially available and well known to those skilled in the art. Sputter coating technology is presently commercially employed, for example, to deposit similar film stacks onto glass plys of a laminated automotive windshield for the purpose of electrically heating the windshield. In fact, in certain preferred embodiments of the invention, the SLR element is connected to an electrical power source for purposes of electrically heating the glazing unit. That is, the SLR element can provide solar load reduction and electrical heating. In the case of a motor vehicle windshield, for example, the SLR element 16 would be connected to the electrical system of the vehicle in accordance with techniques presently commercially employed.

Figure 3:
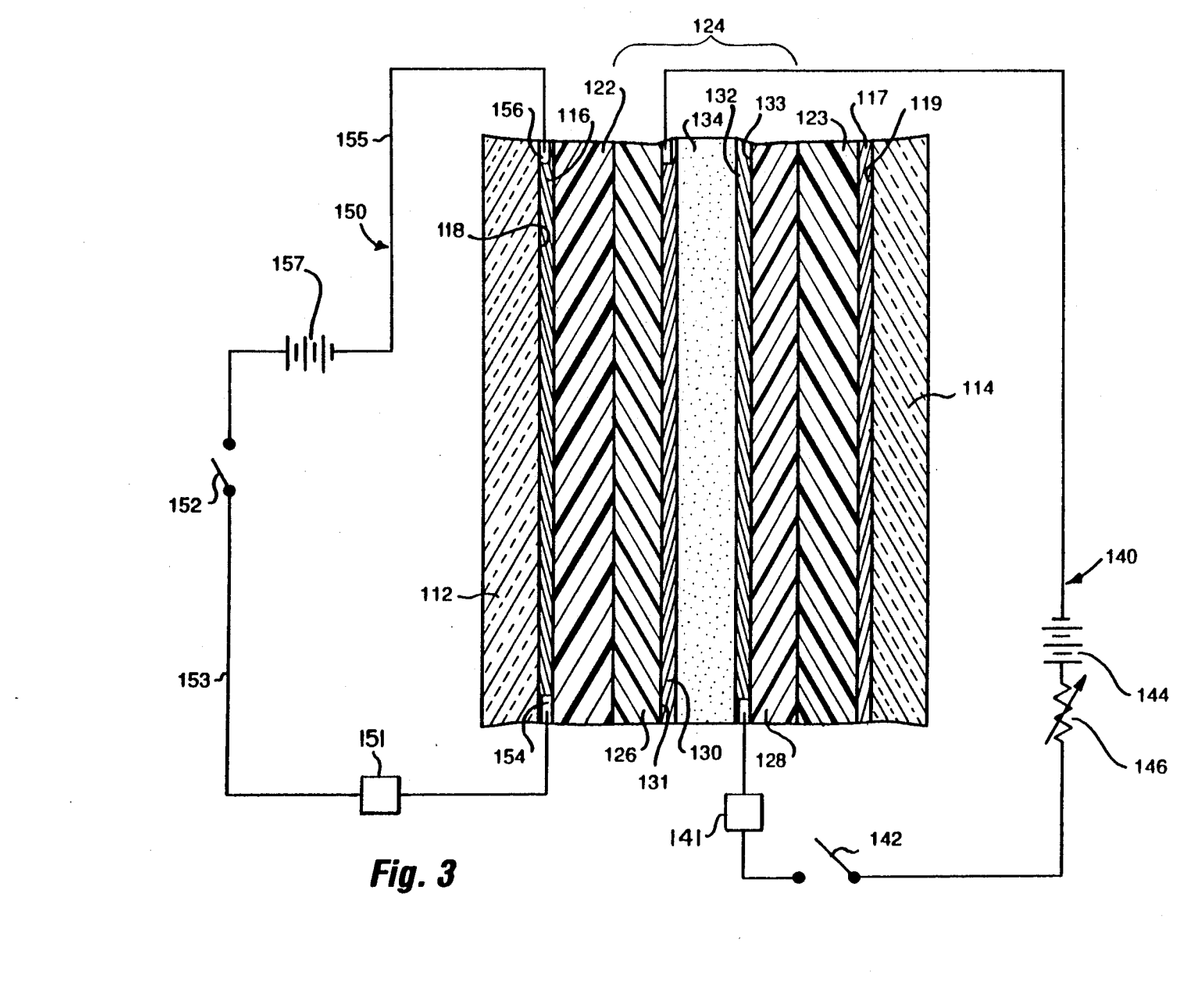
FIG. 3 is a schematic, partial sectional view (corresponding to the view of FIG. 2) of a second preferred embodiment of the invention, wherein two electrical circuits of the vision unit are illustrated diagrammatically.

Suitable circuitry is required to provide electrical power to the SLR element if it is to be used for the additional purpose of electrically heating the glazing unit. A cross-sectional view of a preferred embodiment of the invention incorporating this feature is seen in FIG. 3. Glass plys 112 and 114 are laminated to polyvinylbutyral layers 122 and 123. The laminated surface 118 of outer glass ply 112 is sputter coated with an SLR element 116 which is substantially the same as SLR element 16 of the embodiment of FIGS. 1 and 2. A second optional SLR element 117 is sputter coated onto laminated surface 119 of inner glass ply 114. This second SLR element could be provided in accordance with the manufacturing means and materials for SLR element 116. While it further reduces transmittance through the glazing unit, the cost/benefit ratio will not justify its use in all applications. An electro-active element 134 is incorporated in accordance with the fabrication techniques and materials described above for electro-active element 34 of the embodiment of FIGS. 1 and 2. Thus, in the preferred embodiment of FIG. 3 the electro-active element 134 comprises first polyethylene terephthalate layer 126 and second polyethylene terephthalate layer 128. Electrode 130 is sputter coated onto inner surface 131 of layer 126. Similarly, electrode 132 is carried on inner surface 133 of layer 128. Electroactive material 134 is sandwiched between electrodes 130 and 132. Electrical circuit 140 comprises suitable fault detection circuitry 141 similar to circuitry 52 discussed above for the embodiment of FIGS. 1 and 2, on/off switch 142 and variable resistor means 146. It connects electrodes 130 and 132 to electrical power source 144, such that an electrical field can be applied to the electro-active material by applying a electrical potential across the electrodes.

A second circuit 150 provided with electrical circuitry means provides electrical power to the SLR film stack 116 to generate heat for deicing and defogging the windshield. Optionally, SLR film stack 117 could also be used for heating. Circuit 150 is seen to comprise, in addition to the electrically conductive SLR film stack 116, an on/off switch 152 interrupting electrical lead 153 which extends to a bus bar 154 via suitable connection means, such as the solder pad connections described above in connection with the embodiment of FIGS. 1 and 2. Similarly, electrical lead 155 extends to bus bar 156 at the other end of the SLR film stack. The electrical power source 157 may be the same as, or different from, electrical power source 144. In the case of a motor vehicle, the power sources 157 and 144 preferably are the same and comprise the motor vehicle alternator system. The bus bars and electrical leads corresponding to leads 48a and 50a of the electro-active element of the embodiment of FIGS. 1 and 2 can be formed by silk screening electrically conductive ceramic paint onto the surface of the glass ply 112, or formed by other methods known to the skilled of the art. Suitable fault detection circuitry 151 similar to circuitry 52 of the embodiment of FIGS. 1 and 2 also can be incorporated in the manner and for the reasons discussed above.

In all other respects the glazing unit of FIG. 3 can be constructed using materials and processes substantially the same as that described above in connection with the embodiment of FIGS. 1 and 2. Thus, the glazing unit of FIG. 3 provides variable, controllable transparency to visible light while at all times also providing highly effective SL functionality. Together with these features, the glazing unit of FIG. 3 further provides operator-controlled electrical heating to de-ice or de-fog the glazing unit. All these functionalities and features are provided in a glazing unit which can be constructed using presently available methods and materials. Thus, a completed glazing unit can be produced which is highly cost effective, narrow in cross section and relatively low weight, making it highly advantageous for use in architectural and especially automotive applications.

Figure 4:
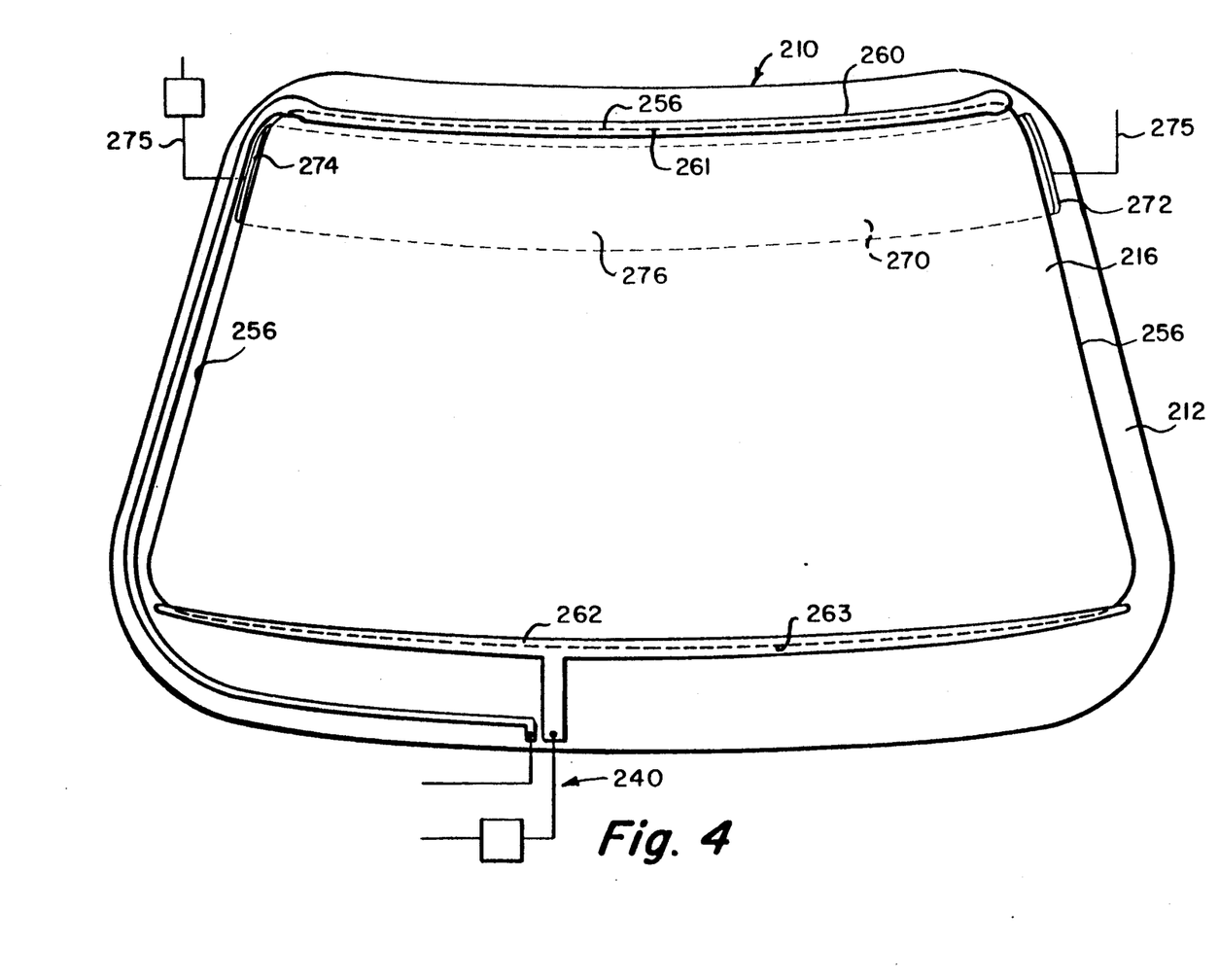
FIG. 4 is a schematic view of another preferred embodiment of the glazing unit of the invention, specifically, an electrically heated motor vehicle windshield.

A particularly advantageous application of a glazing unit having the various features of the preferred embodiment of FIG. 3 is illustrated in FIG. 4. The embodiment of FIG. 4 is adapted for use as a motor vehicle windshield. For motor vehicle windshield applications, it presently is preferred to employ a multi-ply, laminated construction having a glass inner ply and a glass outer ply. Motor vehicle windshield 210 comprises an SLR element 216 having an outer perimeter 256. The SLR film stack is seen to be substantially coextensive with the vision area of the windshield. The SLR element is a Fabry-Perot interference filter sputter coated onto the laminated inside surface of outer glass ply 212. Electrical circuit 240 provides electrical energy from the motor vehicle's electrical power system to the SLR element for electrical heating of the element for purposes of deicing or defogging the windshield. Such circuitry includes manual and/or automatic switching means for actuating and de-actuating the heating function, circuit fault detection circuitry and such other features as are described above. Included in such circuitry are upper bus bar 260 and lower bus bar 262 which are in electrical contact with the upper edge 261 and the lower edge 263, respectively, of the SLR film stack. To provide good distribution of electrical power, and hence heating, in the SLR element, the bus bars, as shown, preferably comprise a pair of spaced, substantially parallel, elongate bus bar in electrical contact with opposite edges of the SLR film stack. Since the lower bus bar is longer than the upper bus bar, a recess preferably is provided at the left side (as viewed in FIG. 4) of the lower edge of the upper bus bar 260. A similar recess should be provided on the right side if a second electrical lead is used to connect the right side of the upper bus bar to circuit 240. A recess also is desirable at the intersection of the upper bus bar with the edge of the SLR film stack. The recesses serve to more evenly distribute electrical power.

A second set of bus bars provides electrical power to the electro-active element 270. Specifically, right side electrode 272 and left side electrode 274 provide power via circuit 275 to apply an electric field across the electro-active material 276 to control its transparency to visible light. The upper portion of windshield 210, that is, that portion in which the electro-active element 270 overlays the upper portion of the SLR/electrical heating element 216 has a cross sectional construction substantially as shown in FIG. 3 except that the second SLR film 117 may, optionally, be deleted. Thus, the first set of bus bars for the SLR/ electrical heating element is electrically isolated from the second set of bus bars for the electro-active element. Such electrical isolation is provided, at least in part, by a laminating layer positioned between them, preferably PVB, corresponding to laminating layer 122 in the embodiment of FIG. 3.

Since the glazing unit of FIG. 4 is intended for use as a motor vehicle windshield, the electro-active material 276 covers only its upper portion. Thus, even in its nontransparent condition, the electro-active element does not prevent the driver's vision through the main area of the windshield. The electro-active element can be used, however, to partially or totally block sunlight glare which at times would itself otherwise seriously reduce a driver's vision. Preferably the electro-active material extends across substantially the entire width of the windshield in the uppermost 10% to 25% portion of the windshield.

It will be appreciated from the foregoing that the present invention provides high SLR functionality together with transparency control. The glazing unit can be produced using currently available fabrication equipment and techniques. In addition, the particular materials and configuration of the glazing unit provide good long term durability and functionality, particularly with respect to interfacial adhesion of the laminated surfaces.

While particular embodiments of the invention have been illustrated and described, it will be apparent to those skilled in the art in view of the above disclosure that various modifications can be made without departing from the true spirit and scope of the invention. The appended claims are intended to cover all such modifications.

We claim:

1. A laminated glazing unit which is substantially transparent to visible light in at least one selectable condition and less transparent in a second selectable condition, the glazing unit comprising:
   a first ply which is substantially transparent and substantially inextensible;
   electro-active means for controlling transparency to visible light, the electro-active means comprising (i) first and second flexible, substantially inextensible polymer layers, each having an inward surface facing the other, (ii) first and second electrodes on the inward surface of the first and second polymer layers, respectively, and (iii) a layer of electro-active material sandwiched between the electrodes, the electro-active material being controllably switchable from the first condition to the second, less transparent condition by selected application of electrical potential across the electrodes;
   a first laminating layer of flexible polymeric material mediate a surface of the first ply and an outward surface of the first polymer layer of the electro-active means; and
   a Fabry-Perot interference filter for preferentially reducing infrared light energy transmitted through the glazing unit, the interference filter comprising a film stack sputter coated onto said surface of the first ply mediate the first ply and the first laminating layer, the film stack including, in order, at least a first zinc oxide film proximate to the first ply, a first silver metal film, a second zinc oxide film, a second silver metal film and a dielectric film adjacent the first laminating layer, the first laminating layer laminating the first polymer layer to the film stack on the surface of the first ply.

2. The laminated glazing unit of claim 1 wherein the electro-active material is a liquid crystal.

3. The laminated glazing unit of claim 2 wherein the liquid crystal is a nematic liquid crystal.

4. The laminated glazing unit of claim 1 wherein the electro-active material is an electrochromic material.

5. The laminated glazing unit of claim 4 wherein said electrochromic material is tungsten oxide.

6. The laminated glazing unit of claim 1 further comprising a second ply which is substantially transparent and substantially inextensible, and a second laminating layer of flexible polymeric material laminating the second ply to an outward surface of the second polymeric layer of the electro-active means, the electro-active means being sandwiched between the first laminating layer and the second laminating layer.

7. The laminated glazing unit of claim 1 wherein each electrode is an indium-tin oxide film sputter coated onto the inward surface of a corresponding one of the inextensible polymer layers.

8. A multi-element, laminated glazing unit which is substantially transparent to visible light in at least one selectable condition and substantially non-transparent in a second selectable condition, the glazing unit comprising:
    electro-active means for controlling transparency to visible light, the electro-active means comprising (i) first and second electrodes sandwiching between them (ii) a layer of electro-active material which is controllably switchable from the substantially transparent condition to the substantially non-transparent condition by selected application of electrical potential across the electrodes, and (iii) first and second flexible, substantially inextensible polymeric layers sandwiching the electrodes and electro-active material between them, wherein the electrodes are sputter coated, one each, onto an inward surface of a corresponding one of the inextensible polymeric layers;
    first and second substantially transparent, substantially self-supporting plys sandwiching between them said electro-active means;
    a first laminating layer of flexible polymeric material mediate the electro-active means and the first substantially self-supporting ply, and a second laminating layer of flexible polymeric material laminating the electro-active means to the second substantially self-supporting ply; and
    a Fabry-Perot interference filter for reducing infrared light energy transmitted through the glazing unit, the interference filter comprising a film stack sputter coated onto a surface of the first ply, mediate the first ply and the first laminating layer, the film stack including, in order, at least a first zinc oxide film adjacent the first ply, a first silver metal film, a second zinc oxide film, a second silver metal film and a dielectric film adjacent the first laminating layer, the first laminating layer laminating the first polymer layer to the film stack on the surface of the first ply.

9. The multi-element, laminated glazing unit of claim 8 wherein the first and second self-supporting plys are glass.

10. The multi-element, laminated glazing unit of claim 8 wherein the third dielectric film is zinc-oxide with a film of chromium oxide complex thereover immediately adjacent the first laminating layer 11. The multi-element, laminated glazing unit of claim 8 wherein the third dielectric film is tantalum pentoxide.

12. The multi-element, laminated glazing unit of claim 8 wherein the third dielectric film is zinc oxide with a film of $SiO_2$ thereover immediately adjacent the first laminating layer.

13. The multi-element, laminated glazing unit of claim 8 wherein the polymeric layers are polyethylene terephthalate.

14. The multi-element, laminated glazing unit of claim 13 wherein each of the electrodes is a film of indium-tin oxide sputter coated onto the inward surface of a corresponding one of the polymeric layers.

15. The multi-element, laminated glazing unit of claim 8 wherein the electro-active material is a nematic droplet/polymer film liquid crystal.

16. The multi-element, laminated glazing unit of claim 8 wherein the electro-active material is tungsten oxide.

17. A laminated window which is substantially transparent to visible light in at least one selectable condition and substantially translucent in a second selectable condition, the laminated window comprising:
    electro-active means substantially coextensive with the laminated window for controlling the amount of visible light transmitted through the laminated window, the electro-active means having indium-tin oxide electrodes sandwiching between them a layer of liquid crystal material which is controllably switchable from the substantially transparent condition to the substantially translucent condition by selected application of electrical potential across the electrodes, and polyethylene terephthalate layers sandwiching between them the electrodes and the liquid crystal material, the indium-tin oxide electrodes being continuous sputter coated films, one on each of the polyethylene terephthalate layers;
    first and second glass plys sandwiching the electro-active means between them;
    an SLR film stack sputter coated onto a surface of the first glass facing the electro-active means, the SLR film stack including a zinc oxide film immediately adjacent the glass ply, a silver metal film over the zinc oxide film, a second zinc oxide film over the silver metal film, a second silver metal film over the second zinc oxide film and a film adjacent the polyvinyl butyral layer which is selected from (i) a zinc oxide film with a chromium oxide adhesion promoting film immediately adjacent to the polyvinyl butyral and (ii) a tantalum pentoxide film; and
    a first polyvinylbutyral layer laminating the electro-active means to the SLR film stack, and a second polyvinylbutyral layer laminating the electro-active means to the second glass ply.

18. The laminated window of claim 17 wherein the laminated window is a motor vehicle windshield and the electro-active means extends laterally across only an upper portion of the windshield.

19. The laminated window of claim 17 further comprising a second SLR film stack between the second polyvinylbutyral layer and the second glass ply.

20. A laminated glazing unit which is substantially transparent to visible light in at least one selectable condition, the glazing unit comprising:

a first ply which is substantially transparent, substantially inextensible and substantially self-supporting;

electro-active means for controlling the amount of visible light transmitted through the glazing unit, the electro-active means comprising (i) first and second flexible, substantially inextensible polymer layers, each having an inward surface facing the other, (ii) first and second electrodes on the inward surface of the first and second polymer layers, respectively, and (iii) a layer of electro-active material sandwiched between the electrodes, the electro-active material being controllably switchable from a first condition substantially transparent to visible light to a second, less transparent condition by selected application of electrical potential across the electrodes;

a Fabry-Perot interference filter for reducing infrared light energy transmitted through the glazing unit, the interference filter comprising a film stack sputter coated onto a surface of the first ply, mediate the first ply and the first laminating layer, the film stack including, in order, at least a first zinc oxide film adjacent the first ply, a first silver metal film, a second zinc oxide film, a second silver metal film and a dielectric film adjacent the first laminating layer, a first laminating layer of flexible polymeric material laminating the interference filter on the surface of the first ply to an outward surface of the first polymer layer of the electro-active means; and electrical heating means for passing an electrical current through the film stack of the Fabry-Perot interference filter to electrically heat the windshield, the film stack being substantially electrically isolated from the electro-active means.

21. The laminated glazing unit of claim 20 wherein the electrical heating means comprises a pair of spaced, substantially parallel, electrically conductive elongate bus bars in electrical contact with the film stack.

22. An electrically heated, laminated motor vehicle windshield having a laterally extending upper edge, a laterally extending lower edge and right side and left side edges, the windshield comprising:

electro-active means extending laterally across an upper portion of the windshield for controlling the amount of visible light transmitted through the upper portion;

an electrically conductive SLR film stack on, and substantially coextensive with, a laminated surface of a substantially inextensible ply of the windshield; and electrical heating means for passing an electrical current through the electrically conductive SLR film stack, the electrically heated windshield and the electrically conductive SLR film stack being effectively electrically isolated from the electro-active means.

23. The electrically heated, laminated motor vehicle windshield of claim 22 wherein the electro-active means extends across approximately an upper 10% to 25% portion of the windshield.

24. The electrically heated, laminated motor vehicle windshield of claim 22 wherein the electro-active means comprises (i) a layer of electro-active material substantially coextensive with said upper portion of the windshield and sandwiched between (ii) first and second electrodes comprising electrically conductive films substantially coextensive with the layer electro-active material, and (iii) right and left side bus bars extending along the right side and left side edges, respectively, of the windshield, each in electrical contact with a corresponding one of the electrodes.

* * * * *